US 8,588,753 B2

United States Patent
Patino

(10) Patent No.: US 8,588,753 B2
(45) Date of Patent: Nov. 19, 2013

(54) APPARATUS AND METHOD IN A WIRELESS DEVICE FOR REESTABLISHING A CALL

(75) Inventor: Joseph Patino, Miramar, FL (US)

(73) Assignee: BlackBerry Limited (CA)

( * ) Notice: Subject to any disclaimer, the term of this patent is extended or adjusted under 35 U.S.C. 154(b) by 116 days.

(21) Appl. No.: 13/208,521

(22) Filed: Aug. 12, 2011

(65) Prior Publication Data
US 2013/0040616 A1     Feb. 14, 2013

(51) Int. Cl.
*H04W 92/00*     (2009.01)

(52) U.S. Cl.
USPC ....................... 455/414.1; 370/252

(58) Field of Classification Search
USPC ......... 455/414.1, 414.2, 452.1, 453; 370/252, 370/328
See application file for complete search history.

(56) References Cited

U.S. PATENT DOCUMENTS

2009/0296688 A1*  12/2009  Bakker et al. ................. 370/352

\* cited by examiner

*Primary Examiner* — Sam Bhattacharya
(74) *Attorney, Agent, or Firm* — Wolff & Samson, PC

(57) ABSTRACT

An apparatus and a method in a wireless device provide for reestablishing a dropped call, wherein a wireless device determines a wireless device callback priority, wherein the wireless device callback priority is relative to a second communication device callback priority associated with a second communication device, wherein the wireless device and the second communication device are established in a communication session. A dropped call between the wireless device and the second communication device is detected. In response to detecting the dropped call, and the wireless device callback priority being higher than the second communication device callback priority, the wireless device calls back the second communication device. If, during the calling back, a match between a callback identifier and an incoming caller identifier of an incoming call is detected, the calling back is terminated, and the incoming call is answered.

20 Claims, 3 Drawing Sheets

APPARATUS AND METHOD IN A WIRELESS DEVICE FOR REESTABLISHING A CALL

The present disclosure relates generally to an electronic device, such as a wireless device, cellular phone, smart phone, tablet computer, or other electronic device that includes a communications module that can operate in a communications session. More particularly, the present disclosure relates to an apparatus and a method for reestablishing a dropped call in an electronic device.

BACKGROUND OF THE DISCLOSURE

In a wireless communication system, data can be transmitted between a base station and a wireless mobile device in a communication session. The communication session can be a voice call, a data call, or data communication session. The data call can include a voice call supported by a voice over Internet Protocol session. Data calls can also support data communications sessions with network servers, or similar data connections.

Although signal coverage and reliability for wireless devices, such as cellular telephones, has improved over the years, there are still times when the wireless device will drop a call. Dropped calls (whether voice or data) can occur when there is not enough radio frequency signal strength to maintain a call (or other data transfer session). Dropped calls can also occur because of infrastructure errors or problems, and because a capacity of a communications system has been exceeded. Calls can be dropped because lower priority data traffic is terminated to provide capacity for higher priority traffic. Electromagnetic interference can cause a dropped call.

Most times after a call is dropped one or more of the users of the communications session (wherein "users" can include human users and computer processes) will want to reconnect or reestablish the dropped call. This can be frustrating, time consuming, and wasteful of communication system resources when both users of the dropped call simultaneously attempt to reestablish the dropped call. This can result in one or more of the users being forwarded to voice mail or a busy signal because the callbacks have crossed and interfered with each other. For example, the first device callback to the second device can fail because the second device is busy calling back the first device, and vise versa.

This problem can occur with many kinds of electronic devices that connect with voice or data calls, or communications sessions, using communications systems that can drop the call. Examples of such electronic devices include many portable wireless electronic devices, such as cellular telephones, smart phones, tablet computers, laptop computers, and the like. The problem of reestablishing a call can also occur with wired devices, such as a telephone using voice-grade telephone service (plain old telephone service or POTS), or VOIP phone that uses voice over Internet Protocol.

In view of these deficiencies in the operation of electronic devices, an improved apparatus and method for reestablishing a dropped call in a communication system is needed. It is in view of this background information related to dropped calls in communications systems that the significant improvements of the present disclosure have evolved.

DETAILED DESCRIPTION

Figure 1:
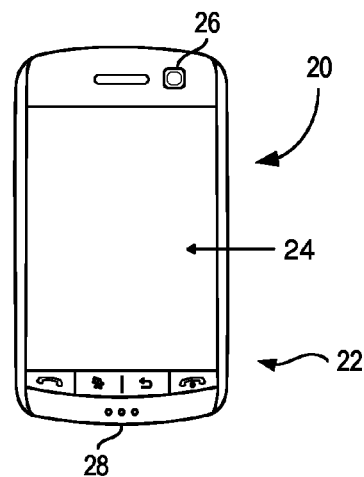
FIG. 1 is a front elevation view of an electronic device, such as a smart phone, in accordance with an example embodiment of the present disclosure.

An embodiment of the present disclosure advantageously provides an apparatus and a method for reestablishing a dropped call in an electronic device, such as a wireless device. The disclosure generally relates to an electronic device, which can be a portable electronic device, or a wireless electronic device, in the embodiments described herein. Examples of an electronic device include a cellular phone, smart phone, or other device that can operate in a communication system as part of a communication session, wherein voice data, video data, or other data is transferred between the electronic device and a second communications device.

For simplicity and clarity of illustration, reference numerals may be repeated among the figures to indicate corresponding or analogous elements. Numerous details are set forth to provide an understanding of the embodiments described herein. Some embodiments may be practiced without these details. In other instances, well-known methods, procedures, and components have not been described in detail to avoid obscuring the embodiments described. The description should not be considered as limited to the scope of the embodiments described herein.

Referring first to FIG. 1, a representative electronic device 20 is depicted. While in the example of FIG. 1, electronic device 20 is a smart phone, other examples of electronic devices 20 can include, a cellular telephone, a tablet computer, a laptop computer, and other similar data processing devices. Some of these exemplary electronic devices 20 can communicate wirelessly with a network, such as a cellular phone network, a data network, a wireless local area network, or other similar communications systems. Electronic device 20 may also be able to communicate data representing text, images, video, data files, command and control information, programs, and the like.

As shown in FIG. 1, user operation of electronic device 20 can be implemented with buttons or keypad 22, which can be used to select various menus and functions. In some embodiments, data, menus, and functions of electronic device 20 can be displayed and selected (or otherwise manipulated) using display 24. In some embodiments, display 24 can incorporate a touchscreen, which is sensitive to human touch or input with a stylus. Using a touchscreen, an on-screen keypad can be implemented as a display of keys or buttons arranged on display 24. Keypad 22 and display 24 can be used together to enter text data into electronic device 20. Such data can be used to control, set parameters, or select operating modes for electronic device 20. Display 24 can be used to display menus or operating modes of wireless device 26. Speaker 26 can be used to output sound associated with a voice call. Microphone 28 can be used to input audio information for a voice call, or provide other sound input to electronic device 20.

Figure 2:
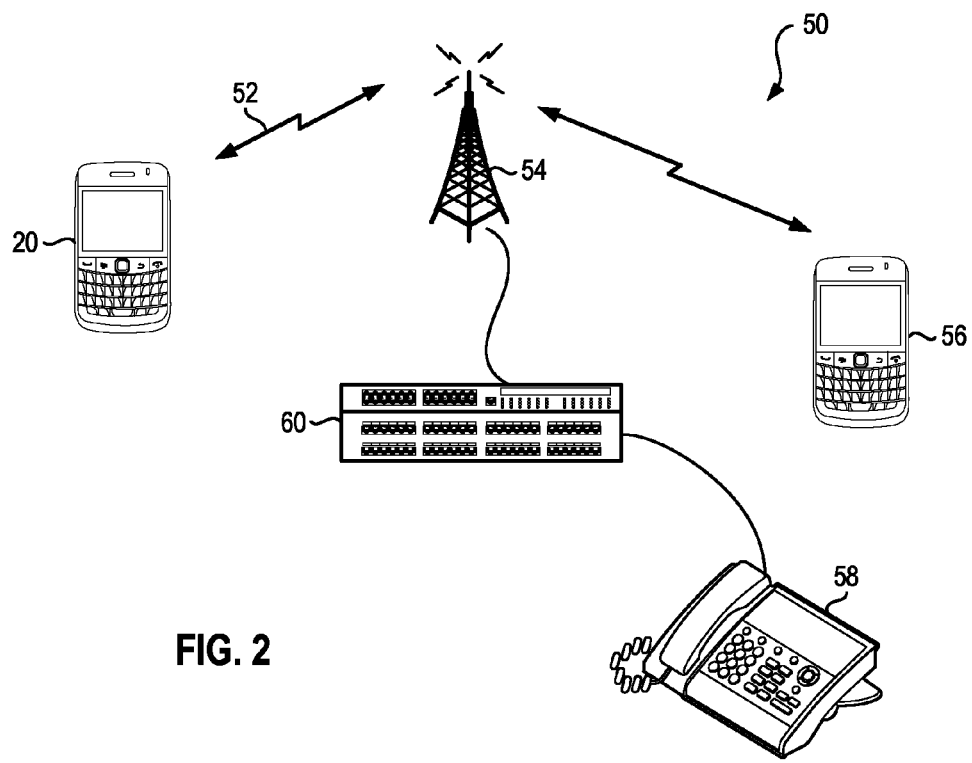
FIG. 2 is a schematic representation of a communication system in which the electronic device shown in FIG. 1 can operate.

Referring now to FIG. 2, there is depicted communication system 50, which can include electronic device 20 (which may be referred to as wireless device 20 in the example illustrated) having, for example, a wireless communication link 52 with base station 54. Wireless device 20 can be in a communication session with other devices in communication system 50, wherein the other device can be referred to as a second communication device. For example, wireless device 20 can be in a voice or data communication session with wireless device 56, which can also be similar to wireless device 20. Alternatively, wireless device 20 can be in a communication session with telephone 58, which can be coupled to base station 54 by switch 60. Telephone 58 can be a conventional wireline (POTS) telephone, or telephone 58 can be a communications device capable of having a voice-over-Internet-Protocol telephone call. In other examples, the second communication device that can be in a communication session with wireless device 20 can be a computer or server (not shown). Switch 60 can be capable of switching voice communication sessions or data communication sessions, wherein telephone conversations are supported by voice communication sessions (i.e., a voice call), and file transfers, web browsing, multimedia data sessions, or the like can be supported by data communication sessions (i.e., a data call). In some embodiments, switch 60 can have functions and signaling capabilities that support the apparatus and method disclosed herein. Thus, the method and apparatus for reestablishing a dropped call need not be limited to implementation in wireless devices, such as wireless devices 20 and 56. Additionally, the methods and apparatus disclosed herein can be implemented in a single device on one end of a communications session, or can be implemented between two communication devices on both ends of a communication session, wherein one or more devices can each implement methods and have apparatus similar to those disclosed herein.

Figure 3:
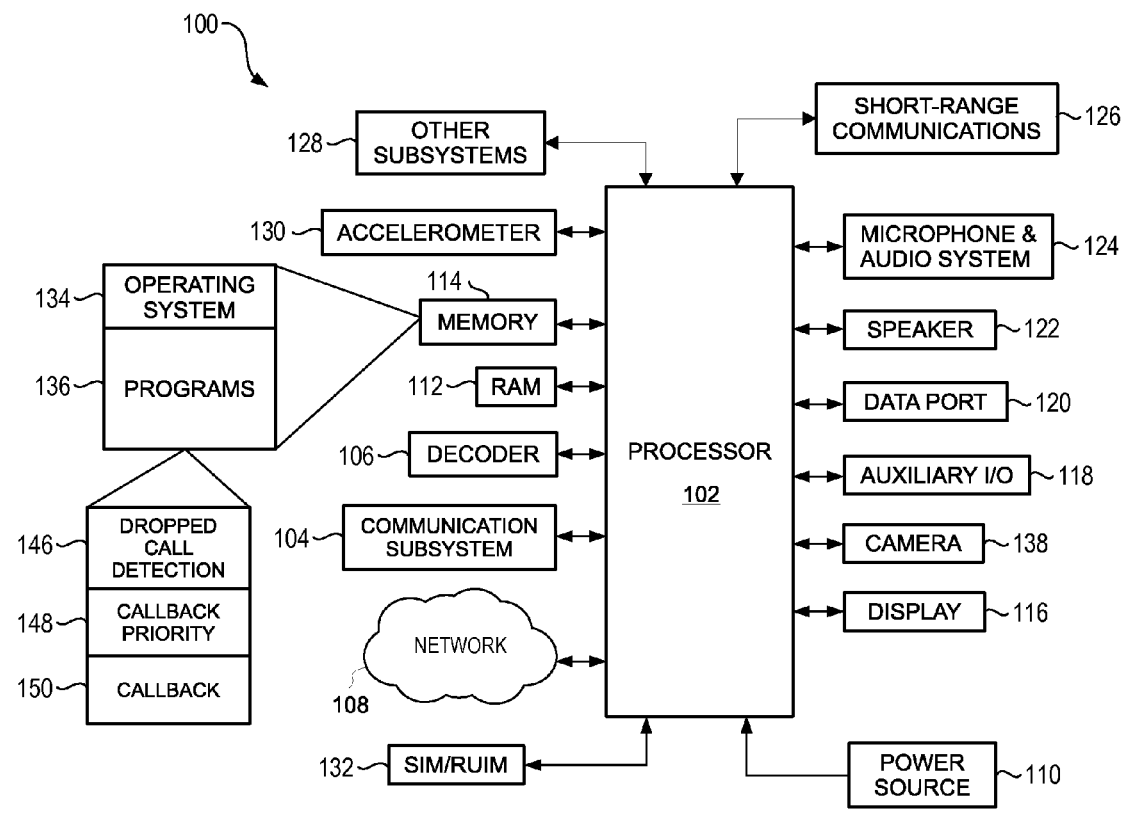
FIG. 3 depicts a high-level functional block diagram of an electronic assembly for operation of the electronic device shown in FIG. 1.

FIG. 3 depicts a high-level functional block diagram of an electronic assembly 100 for operating electronic device 20 shown in FIG. 1. Electronic assembly 100 can include multiple components, such as processor 102, which can control the overall operation of electronic device 20. In some embodiments, communication functions provided by electronic device 20 can include voice, data, and command communications, which may be implemented by communication subsystem 104. Communication subsystem 104 can be used to initiate and support an active voice call or data communication session. Communication subsystem 104 can include various combinations of hardware, software, and firmware to perform various designed functions. The software can be functionally or conceptually divided into software modules. Software in one module may share or call upon function(s) in another module.

Data received by electronic device 20 can be processed, including decompressed and decrypted, by decoder 106. Communication subsystem 104 can receive messages from, and send messages to, wireless network 108. Communication subsystem 104 can help initiate and operate an active call, wherein electronic device 20 is in a real-time voice communication session. Wireless network 108 may be any type of wireless network, including, but not limited to, a cellular network, a wireless data network, a wireless voice network, and a network that supports both voice and data communications. Wireless network 108 can use a variety of formats, protocols, or standards, such as those specified by standards including Global System for Mobile Communications (GSM), Code division multiples access (CDMA), wireless Ethernet (Institute of Electrical and Electronics Engineers standard 802.11), Wi-Fi, and other similar standards and wireless networking protocols.

Power source 110 can provide power to operate or charge electronic device 20, and can be implemented with one or more rechargeable batteries, or a port to an external power supply, wherein such power supply provides the appropriate power to all components of electronic assembly 100.

Processor 102 can interact with other components, such as random access memory (RAM) 112, memory 114, display 116 (illustrated in FIG. 1 as display 24), auxiliary input/output (I/O) subsystem 118, data port 120, speaker 122, microphone and audio system 124, short-range communications subsystem 126, and other subsystems 128. A user can enter data and operate functions of electronic device 20 with a data input device coupled to processor 102. Data input devices can include buttons or keypad 22 (see FIG. 1), or, in some embodiments, a graphical user interface produced on display 116, which can use touches and gestures detected by a touch-sensitive overlay on display 116. Processor 102 can interact with keypad 22 and/or the touch-sensitive overlay via an electronic controller (which can be represented by other subsystems 128). As part of the user interface, information, such as text, characters, symbols, images, icons, and other items that may be displayed or rendered on electronic device 20, can be displayed on display 116. Processor 102 can interact with accelerometer 130, which may be used to detect a direction of gravitational forces, or user-input acceleration forces. In other embodiments, buttons, such as buttons and keypad 22 in FIG. 1, can be used to operate select functions of electronic device 20.

To identify and authenticate a subscriber for obtaining access to wireless network 108, electronic device 20 can use a subscriber identity module or a removable user identity module (SIM/RUIM) card 132. Alternatively, user identification information can be programmed into memory 114.

Electronic device 20 can include operating system 134 and software programs 136, which can both be executed by processor 102. Operating system 134 and software programs 136 can be stored in a persistent, updatable store, such as memory 114. Additional applications or programs can be loaded onto electronic device 20 through wireless network 108, auxiliary I/O subsystem 118, data port 120, short-range communications subsystem 126, or any other subsystem 128 suitable for transferring program files. Software programs 136 can include software modules, such as dropped call detection module 146, callback priority module 148, and callback module 148, which can be used for controlling the operation of reestablishing a dropped call. Each of these software modules can call upon various hardware and software resources within electronic device 20 to execute its function. Additionally, functions described in the present disclosure can be implemented in various portions of electronic assembly 100, whether those portions be software modules or specialized hardware and firmware modules. In many instances, it may be possible to implement the same function in more than one portion of electronic assembly 100.

A received signal, such as a text message, an e-mail message, or web page download can be processed by communication subsystem 104 and input to processor 102. Processor 102 can processes the received signal for output to the display 116 and/or to the auxiliary I/O subsystem 118. A wireless device user may generate data items, for example e-mail messages, which may be transmitted over wireless network 108 through communication subsystem 104. For voice communications, the overall operation of electronic device 20 can be similar. Speaker 122 can be used to output audible information converted from electrical signals, and microphone and audio system 124 can be used to convert audible information into electrical signals for processing.

Figure 4:
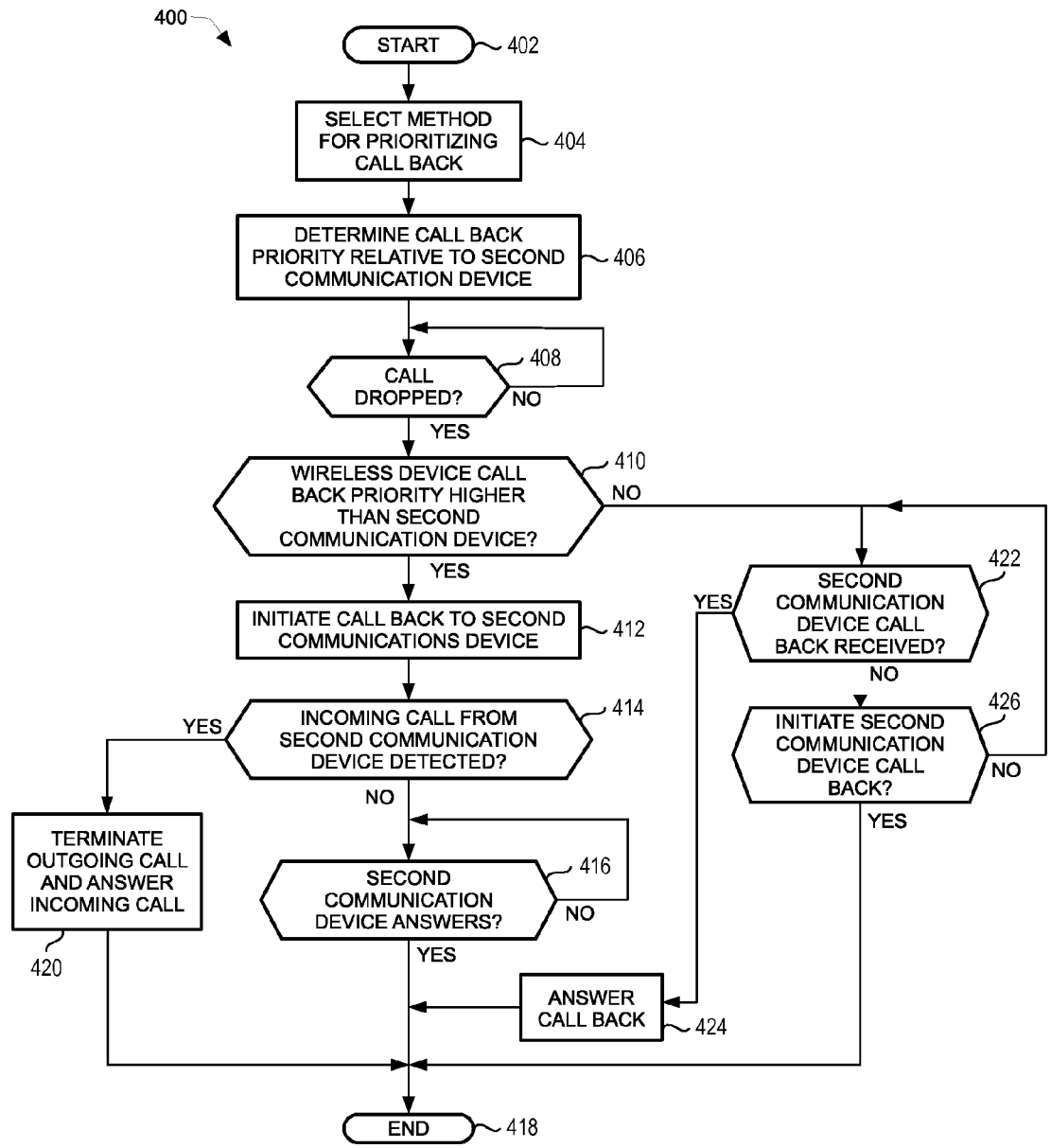
FIG. 4 is a high-level flowchart illustrating a method for reestablishing a dropped call, in accordance with an example embodiment of the present disclosure.

Referring now to FIG. 4, there is depicted a high-level flowchart illustrating an exemplary method of reestablishing a dropped call in an electronic device, such as a wireless device, in accordance with one or more exemplary embodiments of the present disclosure. Such exemplary methods can be controlled by software that can be executed on hardware shown in FIG. 3. For example, the method may be controlled by software, including dropped call detection module 146, callback priority module 148, and callback module 150, which software can be executed using processor 102 within electronic assembly 100 (see FIG. 3). Other embodiments can use various combinations of hardware, firmware, or software to perform similar methods and processes.

As illustrated, method 400 begins at block 402, and continues at block 404, wherein a method is selected for prioritizing a callback between a wireless device (or electronic device) and a second communication device. In an exemplary embodiment, the wireless device can be a cell phone, such as wireless device 20 in FIGS. 1 and 2. The second communication device can be a second wireless device, such as cellular telephone 56 in FIG. 2, or a smart phone, or other similar device. In another embodiment, second communication device can be a plain old telephone service (POTS) telephone (see telephone 58 in FIG. 2) connected to an intelligent telephone exchange (see switch 60 in FIG. 2), or a data processing device capable of transmitting and receiving data in a voice-over-internet-protocol (VOIP) communication session.

In one embodiment, a method for setting a higher or a lower callback priority for each device can use a ranking of a calling identification number (e.g., a telephone number), wherein a device in the communication session with a numerically higher calling identification number receives a higher callback priority than a device in the communication session with a numerically lower calling identification number.

In another embodiment, a method for setting callback priority can set a higher callback priority to a device that originally initiated the communication session (e.g., the voice call or the data call). In other embodiments, other methods for setting a callback priority between communication devices can be used, and when each device in the data transfer session uses a callback priority to reestablish a dropped call, better results and coordination can be achieved when the devices in the communication session each use the same method for selecting a callback priority.

Some or all the devices that are part of the data communication session can communicate, negotiate, and agree upon the method for setting a callback priority for those respective devices. In some embodiments, a communication device may be the only device in the communication session that implements a callback priority and callback procedure. In that case, the device can, by default, assume a higher priority than the second communication device. Knowledge about the device capability for implementing a callback method can be communicated at the beginning of a data communication session, or can be stored in a data table, or database, such as a contacts list that stores an identification of a type of communication device, or data related to capabilities of the communication device (e.g., capabilities of implementing one or more priority based callback methods).

Once the method for prioritizing a callback has been selected, process 400 uses the selected method to determine a callback priority of the wireless device relative to a second communication device in the data communication session, as depicted at block 406. As discussed above, wireless device 20 can select a callback priority based upon a calling identification numbers of devices (e.g., a phone number of wireless device 20) in the communications session. Alternatively, wireless device 20 can select a callback priority based upon which device in the communications session initiated the call.

For example, if wireless device 20 called second communication device 56, then wireless device 20 can assign a wireless device callback priority that is higher than a second communication device callback priority because wireless device 20 initiated the call.

Next, method 400 determines whether the current call has been dropped, as illustrated at block 408. A dropped call can be a call that has been prematurely terminated by any part of communications system 50 other than the end users, or end processes, that control the communication session, and who or which user or process determines that the communication session is complete or no longer needed. For example, a dropped call can be a communication session that has been prematurely terminated by errors in a wireless data link 52, a lack of channel capacity in a wireless base station 54, a software error, a call terminated by data communication infrastructure, and the like. A call terminated by a wireless device user, or by a process that determines the need for the communications session, may not be considered a dropped call. In some embodiments, it can be helpful if the wireless device, or the second communication device, sends a signal to other parties in the communication session that indicates that the data session was intentionally terminated (e.g., a signal that the user has hung up the call, indicating that the communications session is no longer needed). This can be helpful to prevent a callback if the call was not dropped, and the second communication device intended to terminate the call. For example, the callback would not be initiated if the second device hung up on the first device (i.e., the second device user ended the call, expectedly or not).

Thus, at block 408, if a call has not been dropped, method 400 iteratively loops via the "no" branch as the call, or communications session, continues until it is intentionally terminated by a user or the high-level end process using the communications session. On the other hand, if a call has been dropped, the process passes via the "yes" branch to block 410, wherein method 400 determines whether the wireless device has a higher callback priority than the second communication device.

If the wireless device has a higher callback priority, the wireless device initiates a callback to the second communication device, as illustrated at block 412. If the dropped communications session is a voice call, method 400 calls, or dials, the second communication device using the phone number of the second communication device. If the dropped communications session was a data communications session, method 400 attempts to reestablish the data communications session using a caller identification, such as an IP address, of the second communication device.

After initiating the callback, method 400 determines whether an incoming call from the second communication device has been detected, as depicted at block 414. This can be implemented by detecting the reception of an incoming call while waiting for the outgoing callback to be answered by the second communication device. If an incoming call crosses an outgoing callback in this manner, a caller ID (or other calling identification) of the incoming call can be compared to the caller identification of the outgoing callback call. If an incoming call from the second communication device is not detected, method 400 passes to block 416 to wait for the second communication device to answer the callback.

As shown at block 416, method 400 determines whether or not second communication device has answered the callback. If callback has not been answered, method 400 loops by the "no" branch to wait for an answer to the callback. If the second communication device answers the callback, the communication session has been reestablished, and the process of reestablishing the communication session ends, as depicted at block 418.

If, however, at block 414, there is a match between the incoming caller ID and the outgoing calling identification number, method 400 can terminate the outgoing callback, and answer the incoming call, as illustrated at block 420. By terminating the outgoing call and answering the incoming call the communication session can be reestablished, and the second communication device can avoid receiving an indication that the wireless device is unavailable, which is usually indicated by being transferred to the voicemail service of the wireless device.

Referring again to block 410, if method 400 determines that the wireless device has a callback priority that is lower than the callback priority of the second communication device, method 400 passes to block 422, wherein method 400 determines whether a callback has been received from the second communication device. If a callback has been received from the second communication device, method 400 answers the callback, as illustrated at block 424. Thereafter, the process of reestablishing a call ends, as depicted at block 418.

If, at block 422, a callback has not been received from the second communication device, method 400 determines whether or not the wireless device user (or controlling software process) has initiated a callback to the second communication device, as illustrated at block 426. If the user has not initiated a second communication device callback, the process can pass via the "no" branch to block 422, wherein the process iteratively loops to wait for either the reception of a callback from the second communication device (as determined at block 422), or for the user to initiate a callback to the second communication device (as determined at block 426). If the wireless device and the second communication device have each determined that a callback priority and a callback procedure will be implemented if the call is dropped, method 400 can wait in this loop to receive a callback from the second communication device. Alternatively, if the devices have not previously agreed on a callback priority and callback procedure, the wireless device may not wait as long at block 426 before initiating a callback to the second communication device.

Presently preferred embodiments of the disclosure, and many improvements and advantages thereof, have been described with particularity. The description includes preferred examples of implementing the disclosure, and these descriptions of preferred examples are not intended to limit the scope of the disclosure. The scope of the disclosure is defined by the following claims.

What is claimed is:

1. A wireless device comprising:
   a processor;
   a wireless communication subsystem coupled to the processor for establishing a communication session between the wireless device and a second communication device;
   a dropped call detection module coupled to the processor for detecting a dropped communication session;
   a callback priority module coupled to the processor for determining a wireless device callback priority, wherein the wireless device callback priority is one of a higher callback priority and a lower callback priority, and wherein the wireless device callback priority is relative to a second communication device callback priority associated with the second communication device; and
   a callback module coupled to the processor for initiating a callback to the second communication device in response to the dropped call detection module detecting a dropped communication session and the callback priority module determining that the wireless device has a higher callback priority than the second communication device.

2. The wireless device of claim 1 wherein the callback module is further for comparing a callback identifier to an incoming call identifier, and in response to a match between the callback identifier and the incoming caller identifier, terminating the callback and answering the incoming call.

3. The wireless device of claim 1 wherein the communication session is a voice call.

4. The wireless device of claim 1 wherein the communication session is a data transfer session.

5. The wireless device of claim 1 wherein the callback priority module determines the wireless device callback priority based upon a ranking of a calling identification number of the wireless device and a calling identification number of the second communication device.

6. The wireless device of claim 1 wherein the callback priority module determines the wireless device callback priority based upon which device initiated the communication session between the wireless device and the second communication device.

7. The wireless device of claim 1 wherein the second communication device is a wireline telephone and the communication session is a communication session between the wireless device and the wireline telephone.

8. A method in a wireless device for reestablishing a dropped call, the method comprising:
   determining a wireless device callback priority, wherein the wireless device callback priority is relative to a second communication device callback priority associated with a second communication device, wherein the wireless device and the second communication device are established in a communication session;
   detecting a dropped call between the wireless device and the second communication device; and
   in response to detecting the dropped call, and in response to the wireless device callback priority being higher than the second communication device callback priority, calling back the second communication device.

9. The method of claim 8 further comprising:
   during the calling back, detecting a match between a callback identifier and an incoming caller identifier of an incoming call; and
   in response to detecting the match, terminating the calling back, and answering the incoming call.

10. The method of claim 8 wherein the determining a wireless device callback priority further comprises determining a wireless device callback priority based upon a ranking of a calling identification number of the wireless device and a calling identification number of the second communication device.

11. The method of claim 8 wherein the determining a wireless device callback priority further comprises determining a wireless device callback priority based upon which device initiated a communication session between the wireless device and the second communication device.

12. The method of claim 8 wherein the second communication device is a second wireless device, and the determining a wireless device callback priority comprises determining a wireless device callback priority, wherein the wireless device callback priority is relative to a second wireless device callback priority associated with the second wireless device, wherein the wireless device and the second wireless device are established in a voice call.

13. The method of claim 8 wherein the second communication device is a wireline device, and the determining a wireless device callback priority comprises determining a wireless device callback priority, wherein the wireless device callback priority is relative to a wireline device callback priority associated with the wireline device, wherein the wireless device and the wireline device are established in a voice over Internet Protocol session.

14. The method of claim 8 wherein the determining a wireless device callback priority further comprises selecting a method for determining a wireless device callback priority.

15. A method in an electronic device for reestablishing a dropped call, the method comprising:
   determining an electronic device callback priority, wherein the electronic device callback priority is relative to a second communication device callback priority associated with a second communication device, wherein the electronic device and the second communication device are established in a communication session;
   detecting a dropped call between the electronic device and the second communication device; and
   in response to detecting the dropped call, and in response to the electronic device callback priority being higher than the second communication device callback priority, calling back the second communication device.

16. The method of claim 15 further comprising:
   during the calling back, detecting a match between a callback identifier and an incoming caller identifier of an incoming call; and
   in response to detecting the match, terminating the calling back, and answering the incoming call.

17. The method of claim 15 wherein the determining an electronic device callback priority further comprises determining an electronic device callback priority based upon a ranking of a calling identification number of the electronic device and a calling identification number of the second communication device.

18. The method of claim 15 wherein the determining an electronic device callback priority further comprises determining an electronic device callback priority based upon which device initiated a communication session between the electronic device and the second communication device.

19. The method of claim 15 wherein the second communication device is a wireless device, and the determining an electronic device callback priority comprises determining an electronic device callback priority, wherein the electronic device callback priority is relative to a wireless device callback priority associated with the wireless device, wherein the electronic device and the wireless device are established in a voice call.

20. The method of claim 15 wherein the second communication device is a wireless device, and the determining an electronic device callback priority comprises determining an electronic device callback priority, wherein the electronic device callback priority is relative to a wireline device callback priority associated with the wireline device, wherein the electronic device and the wireline device are established in a voice over Internet Protocol session.

\* \* \* \* \*